United States Patent [19]

Fischer et al.

[11] Patent Number: 5,479,983
[45] Date of Patent: Jan. 2, 1996

[54] MULTIPLE ZONE AIR CONDITIONING SYSTEM WITH ZONE SIZE ALTERING FEATURE FOR A PASSENGER AIRCRAFT

[75] Inventors: Heinz Fischer, Henstedt Ulzburg; Wolfgang Mueller, Beckdorf; Ruediger Schmidt, Fredenbeck, all of Germany

[73] Assignee: Deutsche Aerospace Airbus GmbH, Hamburg, Germany

[21] Appl. No.: 210,059

[22] Filed: Mar. 16, 1994

[30] Foreign Application Priority Data

Mar. 17, 1993 [DE] Germany .......................... 43 08 466.4

[51] Int. Cl.⁶ .............................. F24F 11/02; B64D 13/06
[52] U.S. Cl. .................... 165/22; 236/49.3; 244/188.5; 244/118.6; 165/15
[58] Field of Search .................. 165/22, 15; 236/49.3, 236/1 B, 1 C; 244/118.5, 118.6; 454/71

[56] References Cited

U.S. PATENT DOCUMENTS

| | | | |
|---|---|---|---|
| 2,495,856 | 1/1950 | Markusen | 165/15 |
| 2,851,254 | 9/1958 | Messinger et al. | 165/15 |
| 2,872,858 | 2/1959 | Caldwell | 165/22 |
| 2,937,011 | 5/1960 | Brahm | 165/15 |
| 3,711,044 | 1/1973 | Matulich | 165/15 |
| 3,788,386 | 1/1974 | Demaray | 165/22 |
| 3,899,022 | 8/1975 | Persson | 165/22 |
| 4,819,716 | 4/1989 | Beachboard | 165/22 |
| 5,083,727 | 1/1992 | Pompei et al. | 244/118.5 |
| 5,145,124 | 9/1992 | Brunskill et al. | 244/118.5 |

FOREIGN PATENT DOCUMENTS 4-24441  1/1992  Japan .......................... 165/22

*Primary Examiner*—John K. Ford
*Attorney, Agent, or Firm*—W. G. Fasse; W. F. Fasse

[57] ABSTRACT

In an air conditioning system for the passenger cabin of an aircraft, the conditioned air is essentially provided by an air conditioning plant and is introduced into the passenger cabin through several individual air distribution systems (5 to 10) which are each associated with a respective air introduction section (A1 to A6). The length of the passenger cabin is to be divided into several air conditioning zones, for example three air conditioning zones, wherein the number of air introduction sections (A1 to A6) is a multiple of the number of air conditioning zones (2 to 4). A zone temperature sensor (18 to 20) and an associated separate temperature regulation system is provided for each air conditioning zone. A zone control unit (41) is connected to all of the temperature controls of the separate air distribution systems (5 to 10), whereby the zone control (41) selectively associates or couples each air distribution system (5 to 10) with a determined air conditioning zone (2 to 4). In this manner it is possible to select and alter the configuration of the air conditioning zones in the passenger cabin as desired without requiring any physical or mechanical alteration to the air conditioning system, but rather simply by inputting appropriate control signals.

17 Claims, 4 Drawing Sheets

CLIMATE CONTROL ZONE CONFIGURATIONS
CABIN ZONE LENGTH:

| CFG | FWD | MID | AFT |
|-----|-------|---------|---------|
| A | AREA 1 | AREA 2+3 | AREA 4+5+6 |
| B | AREA 1+2 | AREA 3+4 | AREA 5+6 |
| C | AREA 1 | AREA 2+3+4 | AREA 5+6 |
| D | AREA 1+2 | AREA 3+4+5 | AREA 6 |

FIG. 2

MULTIPLE ZONE AIR CONDITIONING SYSTEM WITH ZONE SIZE ALTERING FEATURE FOR A PASSENGER AIRCRAFT

FIELD OF THE INVENTION

The invention relates to an air conditioning system for a passenger aircraft, of which the length of the passenger cabin is to be divided into a number of neighboring air conditioning zones, for example three air conditioning zones, which each have a zone temperature sensor and which each are provided with air conditioned air produced by an air conditioning plant.

BACKGROUND INFORMATION

In air conditioning systems of the above mentioned type, a separate air distributor system is generally associated with each air conditioning zone. Each air distributor system is connected on the one hand to the air conditioning plant, and on the other hand to an air tap system through a controllable mixing valve. A temperature control is provided for each air distributor system. For example, by appropriately controlling the mixing valve in each air distributor system, the temperature of the air delivered from each distributor system is a respective mixed temperature $T_m = t + \Delta t$. The delivered air consists of air provided by the air conditioning plant at a predetermined base temperature t admixed with hot air from the air tap system to achieve a temperature increment $\Delta t$ and result in the mixed temperature $T_m$. Furthermore, a temperature regulation is generally provided for each air conditioning zone.

It is especially important in passenger aircraft to maintain a prescribed cabin temperature for reasons of comfort for the passengers. Because the seating density and therewith the thermal load differs among the various passenger classes within an aircraft cabin, a separate temperature regulation system is required in each passenger class, whereby the desired nominal temperature is to be selected or input by means of a temperature selector. Thus, a passenger cabin is always separated into several air conditioning zones, each of which corresponds to a separate passenger class. Each of the air conditioning zones comprises its own temperature regulation or control. In aircraft using known air conditioning systems of the above described type, once the passenger cabin has been divided into separate air conditioning zones, it is generally impossible to alter or reallocate the air conditioning zones, i.e. to move the boundaries between air conditioning zones, for example. If a reallocation of the air conditioning zones is possible at all, it requires the physical or mechanical alteration and restructuring of the air delivery system.

OBJECTS OF THE INVENTION

In view of the foregoing, it is the aim of the invention to achieve the following objects singly or in combination:

to provide an air conditioning system of the above described type which allows the flexible and reallocatable separation of a passenger cabin into several air conditioning zones;

to provide such an air conditioning system in which a reallocation of the air conditioning zones can be carried out whenever desired in an already existing system by inputting specified control commands;

to divide a passenger cabin into several air introduction sections each with its own air distributor system, wherein the number of air introduction sections is greater than the number of desired air conditioning zones, and to provide a zone control unit which selectively allocates each air introduction section to a respective desired air conditioning zone;

to provide such an air conditioning system in which new configurations of the air conditioning zones can be established without any physical or mechanical reconfiguration of the air distribution system; and to provide an electronic control for such a system, whereby any desired configuration of air conditioning zones can be simply selected as a preprogrammed control input.

SUMMARY OF THE INVENTION

The above objects have been achieved in an air conditioning system according to the invention, wherein an aircraft passenger cabin that is to be divided into a number of air conditioning zones is divided into a greater number of air introduction sections. Each respective air introduction section of the cabin is substantially defined by a separate air distribution system which includes cabin air distribution ducts and passenger air outlets, for example. Each air distribution system has an associated temperature control and all the separate temperature controls are connected to a single air conditioning zone control, whereby each air distribution system can be selectably associated with a respective desired air conditioning zone and can be controlled to provide air at a desired temperature.

According to the invention, a considerable advantage is achieved in that new configurations of the various air conditioning zones can easily be established without any mechanical or physical restructuring of the air conditioning system, but rather by simply making the appropriate input selections into an electronic control. The air conditioning temperature/zone control receives inputs from each zone's temperature selector and each zone's temperature sensor as well as an input device, such as a keyboard for selecting a desired configuration. The temperature/zone control then outputs appropriate control signals to allocate the various air distribution systems to the appropriate air conditioning zones and to control a respective mixing valve associated with each air distribution system to provide air of a required temperature in the desired air conditioning zone. It should be understood that references to air conditioning herein are intended to cover all forms of climate control including heating, cooling, dehumidifying, etc.

A separate digital control unit may be provided for selecting and controlling the desired configuration. A preprogrammed hardware module such as a module including a programmed EPROM can be inserted into the digital configuration control unit to provide a preprogrammed configuration. Alternatively, a keyboard or a disc drive or other input device may be provided for selecting the desired configuration of the air conditioning zones.

BRIEF DESCRIPTION OF THE DRAWINGS

In order that the invention may be clearly understood, it will now be described, by way of example, with reference to the accompanying drawings, wherein:

FIG. 2 is a table showing four different possible air conditioning zone configurations in the aircraft cabin shown in FIG. 1;

DETAILED DESCRIPTION OF PREFERRED EXAMPLE EMBODIMENTS AND OF THE BEST MODE OF THE INVENTION

Figure 1:
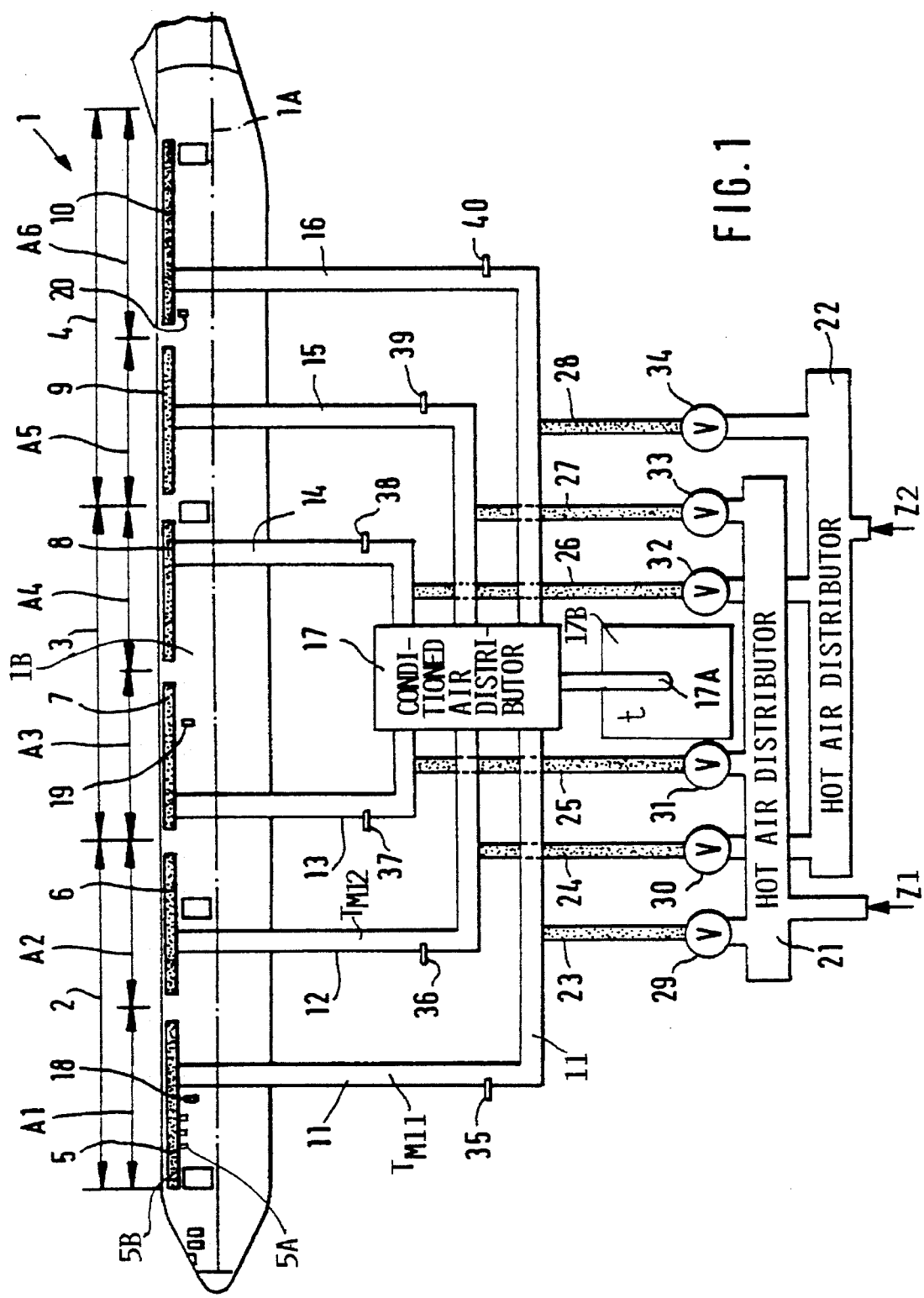
FIG. 1 is a schematic side view of an aircraft body divided into three representative air conditioning zones which are provided with conditioned air from the air conditioning system according to the invention.

FIG. 1 schematically shows one embodiment of the air conditioning system according to the invention. An aircraft body 1 encloses a passenger cabin 1B above the aircraft floor which is indicated by the dash-dotted line 1A. In this embodiment, the passenger cabin is divided into three air conditioning zones, namely a forward zone 2, a central or mid zone 3, and an aft zone 4. Furthermore, in this example embodiment, the cabin is divided into six air introduction sections A1 to A6. Each air introduction section A1 to A6 is respectively associated with or defined by an individual air distribution system 5 to 10. Conditioned air ducts 11 to 16 each connect a respective air distribution system 5 to 10 to a conditioned air distributor or manifold 17, which in turn is connected by an air duct 17A to an air conditioning plant 17B of the aircraft. For reasons of reliability, the air conditioning plant 17B is normally provided redundantly, for example, with two separate air conditioning units.

Within the passenger cabin 1B, a respective zone temperature sensor 18 to 20 is provided in each air conditioning zone 2 to 4. Each zone sensor 18 to 20 measures the air temperature existing within the respective air conditioning zone and is a component of a corresponding closed loop control circuit for maintaining the cabin temperature at a selected setting within each air conditioning zone. Moreover, each zone sensor 18 to 20 is arranged or positioned within the cabin 1B so that each sensor 18 to 20 is always located within the corresponding air conditioning zone 2 to 4, even when the allocation or configuration of the cabin space into separate zones is altered.

Hot intake air Z1, Z2 is provided from an air tap system which is not shown. The hot tap air Z1 and Z2 flows into a respective hot air distributor 21 and 22. From there, the hot air flows through respective mixing valves 29 to 34 and then through respective corresponding admixing air ducts 23 to 28, which each flow into a respective one of the conditioned air ducts 11 to 16. A respective temperature sensor 35 to 40 is provided in each conditioned air duct 11 to 16.

Thus, according to the invention, conditioned air, for example, cooled air, is provided by the air conditioning plant 17B at a base temperature t and is distributed by the conditioned air distributor 17 into the respective conditioned air ducts 11 to 16, where it is admixed with hot air provided by the admixing air ducts 23 to 28 to provide a conditioned air flow. The mixed, conditioned air flow has a mixed temperature, for example $T_{m11}$ shown in the conditioned air duct 11, which is equal to the base temperature t plus a change in temperature $\Delta t$ provided by the admixed hot air stream. The air stream having the desired temperature, for example $T_{m11}$, then flows through the respective duct 11 to 16 and into the respective air distribution system 5 through 10, each of which includes a passenger compartment manifold, for example 5B, and passenger air outlets, for example 5A.

For reasons of reliability or redundancy, the admixing air ducts 23 to 28 are preferably banked and interconnected with the conditioned air ducts 11 to 16 as shown. Thus, the air ducts 11, 13 and 15 and therewith the air introduction sections A1, A3 and A5 are provided with hot air from the hot air distributor 21 through the admixing ducts 23, 25 and 27. On the other hand, the conditioned air ducts 12, 14 and 16 and therewith the air introduction sections A2, A4 and A6 are provided with hot air from the hot air distributor 22 through the admixing air ducts 24, 26 and 28. In this manner, even if one air tap supply Z1 or Z2 or one hot air distributor 21 or 22 becomes inoperational, at least alternating air introduction sections within the passenger cabin 1B will still be provided with properly conditioned air.

The number of air introduction sections A1 to A6 and therewith the corresponding air distribution systems 5 to 10 as provided according to the invention, is to be greater than and preferably a multiple of the number of desired air conditioning zones, for example, 2, 3 and 4 within the passenger cabin 1B. In this manner it is made possible to associate or allocate certain air distribution systems, and therewith certain areas of the cabin, to different air conditioning zones, which may be determined as desired. That is to say, more or fewer of the air distribution systems 5 to 10 can be allocated to each one of the air conditioning zones 2 to 4, and the boundary between neighboring zones can be located and moved as desired between any two neighboring air distribution systems. In order to carry out such configuring of the passenger cabin 1B into the several air conditioning zones 2 to 4, a zone control unit is provided. The zone control unit includes three regulating circuits corresponding to the three air conditioning zones. Depending on the desired applicable configuration of the air conditioning zones, each of the three regulating circuits is connected to activate different ones of the mixing valves 29 to 34, thereby allowing different amounts of hot air to be admixed into the conditioned air stream that is supplied to the respective air distribution systems 5 to 10. In the example embodiment shown, having six air introduction sections A1 to A6, four different air conditioning zone configurations can be realized.

FIG. 2 is a table representing the four different realizable configurations CFG of the air conditioning zones in the passenger cabin 1B. In the first column of the table, the different configurations CFG are designated with the letters A to D. In the second column of the table, the different allocations or configurations of the forward air conditioning zone 2 are represented. Similarly, the third and fourth columns of the table show the different configurations possible for the mid zone 3 and the aft zone 4. Thus, in configuration A the forward zone 2 comprises the air introduction section area 1 or A1 while the mid zone 3 comprises the air introduction sections A2 and A3 and the aft zone 4 comprises the air introduction sections A4, A5 and A6.

It will be recognized that the example embodiment shown in FIG. 1 corresponds to configuration B of the table of FIG. 2. That is to say, in configuration B the air introduction sections A1 and A2 are allocated to the forward zone 2, the air introduction sections A3 and A4 are allocated to the mid zone 3 and the air introduction sections A5 and A6 are allocated to the aft zone 4. In configuration B the passenger cabin 1B is divided into three different air conditioning zones of approximately the same size, for example. This can be achieved especially because the number of air introduction sections A1 to A6 is an exact multiple of the number of zones 2 to 4. On the other hand, if a configuration is desired in which the forward zone 2 is smaller and the aft zone 4 is larger, then configuration A would be selected. Similarly, when different allocations of the passenger cabin space are desired, configurations C or D can be selected. In each case, it should be noted that the described alteration of the cabin configuration is not achieved by altering the existing installation of the air conditioning system components, but rather by simply activating certain switches or circuit components, which in turn activate the appropriate mixing valves to the extent necessary to achieve the desired air flow temperature in each air conditioning zone.

Figure 3:
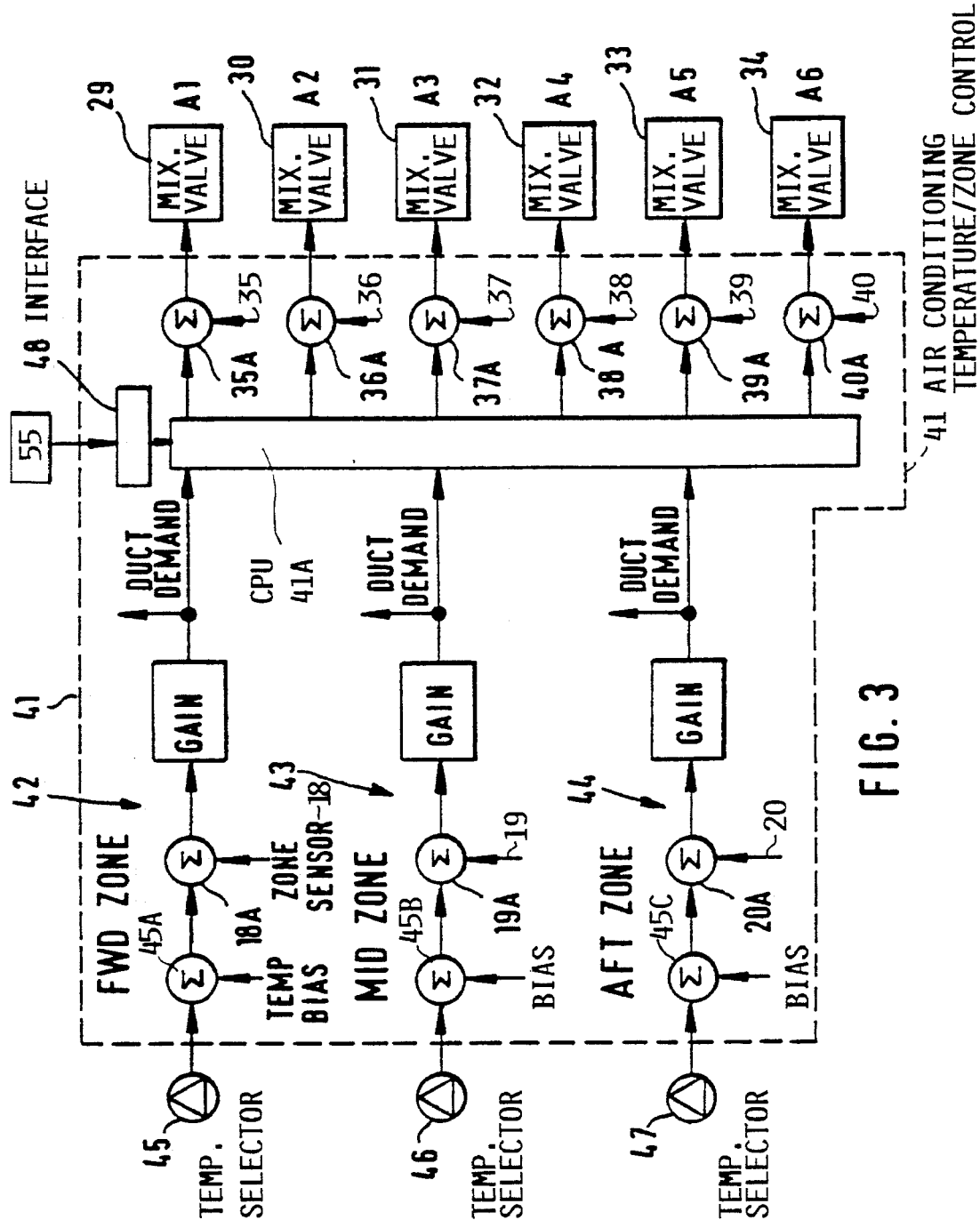
FIG. 3 is a block circuit diagram of the temperature and zone control unit according to the invention.

FIG. 3 is a schematic block circuit diagram showing the operating principle of the temperature control of the air conditioning system according to the invention. The air conditioning temperature/zone control 41 includes three control loop circuits 42, 43 and 44 corresponding to the three air conditioning zones, namely the forward zone 2, the mid zone 3 and the aft zone 4, as well as a control logic circuit 41A which may be implemented in a computer processor CPU 41A. Each zone control circuit 42, 43, 44 comprises a respective temperature selector 45, 46 and 47 as well as summers 18A, 19A and 20A respectively connected to the zone temperature sensors 18, 19 and 20. The desired temperature in each air conditioning zone 2, 3 or 4 is input or selected at the corresponding temperature selector 45, 46 or 47, which provides a corresponding signal to a respective summer 45A, 45B or 45C by which the temperature signal is summed with a temperature bias signal. The output of each summer 45A, 45B and 45C is provided to the respective next summer 18A, 19A or 20A in series, where the signal is summed with the respective zone sensor signal 18, 19 or 20. The signal output from the respective summer 18A to 20A is input into the control logic CPU 41A. In this embodiment having six air distribution systems 5 to 10, the CPU 41A provides six respective output signals to respective summers 35A to 40A, where the signals are combined with signals provided by the temperature sensors 35 to 40 arranged in the conditioned air ducts 11 to 16. The output of each summer 35A to 40A is provided to control a respective mixing valve 29 to 34 associated with the respective air introduction sections A1 to A6.

Control input signals are provided to the CPU 41A through an interface 48. The control input signals represent the desired configuration or allocation of air introduction sections to respective air conditioning zones. The input signals can be provided by any conventional data input device 55, for example, by a keyboard 55 or a disc drive 55, or by data transmission from another digital functional unit. Depending on the control input signals received through the interface 48, the CPU 41A carries out a specified allocation of the air introduction sections A1 to A6 to the appropriate air conditioning zones 2, 3 and 4. This is achieved by appropriately relating signals from each one of the three zone control circuits 42, 43 and 44 with appropriate ones of the mixing valves 29 to 34. For example, in order to establish the configuration B according to the table of FIG. 2 and as shown in FIG. 1, then the CPU 41A uses signals from the forward zone circuit 42 to control the mixing valves 29 and 30 corresponding to air introduction sections A1 and A2, in order to couple the sections A1 and A2 into the forward air conditioning zone 2, whereby the air distribution systems 5 and 6 provide the air flow temperature desired for the forward zone 2.

Similarly, control signals from the mid zone circuit 43 are used to control to mixing valves 31 and 32 in order to couple air introduction zones A3 and A4 into the mid zone 3. Finally, the control signals from the aft zone circuit 44 are used to control the mixing valves 33 and 34 associated with air introduction sections A5 and A6 to provide air of a desired temperature in the aft air conditioning zone 4. Whenever a different zone configuration of the passenger cabin 1B is desired, it is a simple matter to enter different control input signals at 55 through the interface 48 so that the CPU 41A couples the control signals from the zone circuits 42 to 44 with different respective mixing valves 29 to 34 as appropriate for the desired configuration. The implementation and operation of the air conditioning temperature/zone control 41 is based on typical conventional digital control technology.

Figure 4:
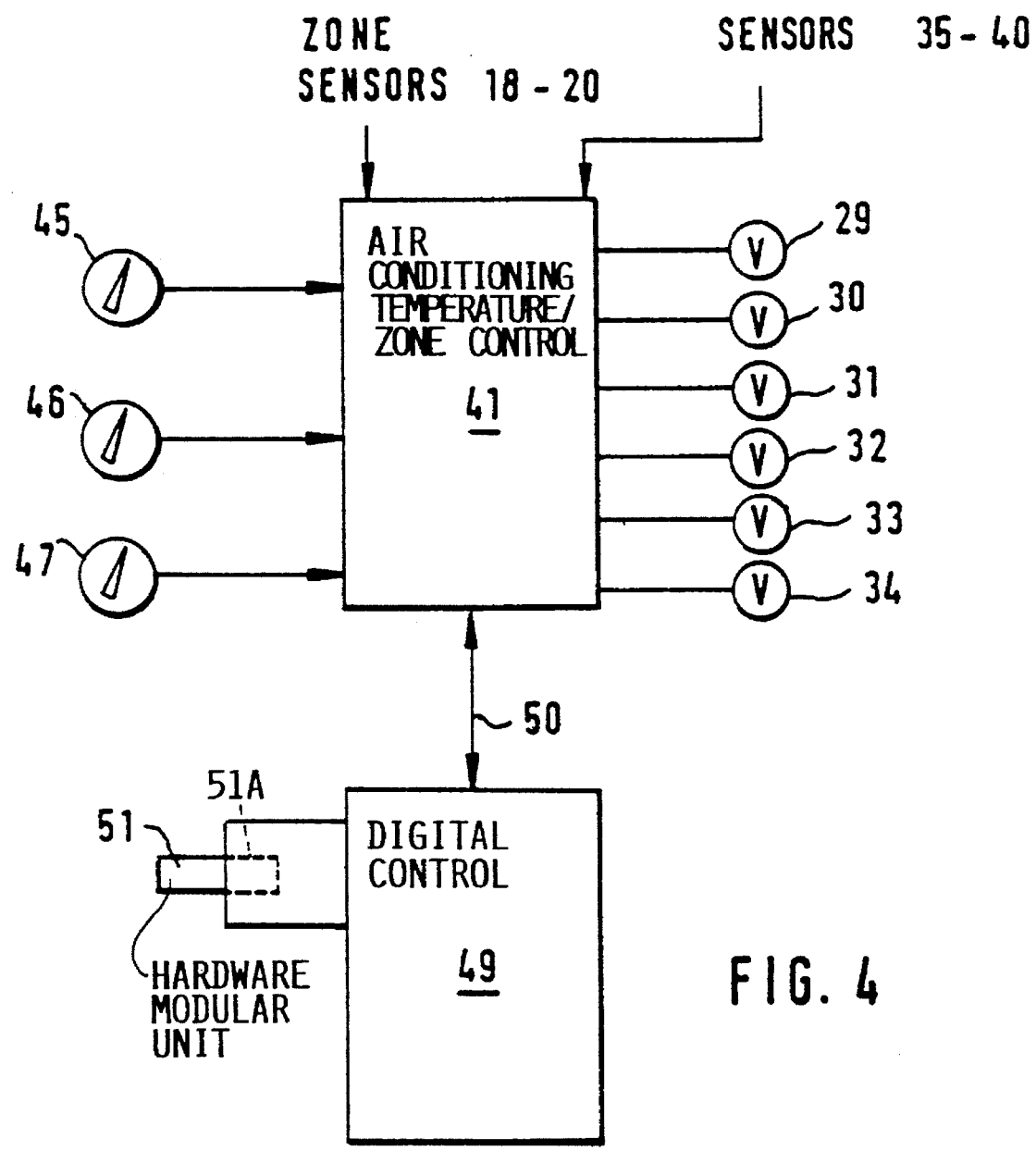
FIG. 4 is a block circuit diagram showing a cabin configuration control connected to the air conditioning zone control.

FIG. 4 is a block diagram schematically showing the air conditioning temperature/zone control 41 with less detail than that shown in FIG. 3, but schematically indicating the externally attached temperature selectors 45, 46 and 47 as well as the mixing valves 29 to 34. Furthermore, external inputs from the zone sensors 18 to 20 and the conditioned air duct sensors 35 to 40 are schematically indicated by input arrows. The control arrangement of FIG. 4 further includes a cabin configuration control unit 49 which is preferably a digital configuration control unit. The configuration control unit 49 is connected by a data bus 50 to the temperature/zone control 41. The cabin configuration control unit 49 digitally controls the configuration of various passenger cabin systems, including the air conditioning system, for which the control unit 49 carries out the corresponding selected configuration. That is to say, the control unit 49 provides appropriate control inputs to the air conditioning temperature/zone control 41 so that the CPU 41A appropriately couples the zone circuits 42, 43 and 44 with respective ones of the mixing valves 29 to 34 as described above.

The cabin configuration control unit 49 preferably includes a socket 51A for receiving a plug-in modular hardware unit 51, which contains all data or information necessary for achieving a desired configuration of the systems which are to be controlled or configured. The plug-in modular hardware unit 51 is preferably a permanently programmed data memory and thereby forms a convenient plug-in data card. All program commands and controls necessary for achieving a predetermined configuration of the air conditioning system, among other things, are preprogrammed and stored in the plug-in modular unit 51. In a preferred embodiment, the plug-in modular unit 51 is preferably based on an electrically programmable semiconductor memory, such as an electrically programmable read-only memory (EPROM). Thus, it is a simple matter to insert a specific plug-in modular unit 51 that has been appropriately preprogrammed to correspond to any desired one of the configurations A to D according to the table of FIG. 2, for example. Thus, the use of a plug-in modular unit 51 containing preprogrammed control information is a convenient alternative to inputting such control information via a keyboard as described above with reference to FIG. 3.

Although the invention has been described with reference to specific example embodiments, it will be appreciated that it is intended to cover all modifications and equivalents within the scope of the appended claims.

What we claim is:

1. An air conditioning system for a passenger aircraft having a passenger cabin (1B) that is to be divided into a first plurality of air conditioning zones (2 to 4) and having an air conditioning plant (17B) providing conditioned air and an air tap system (Z1, Z2) providing heated air, said air conditioning system comprising a second plurality of air distribution systems (5 to 10) that are each connected to said air conditioning plant and that each define an associated air introduction section (A1 to A6) of said passenger cabin, a respective zone temperature regulating arrangement associated with each of said air conditioning zones in said passenger cabin, a respective distribution system temperature control arrangement in each of said air distribution systems (5 to 10), and a zone control unit (41) connected to receive zone signals from said zone temperature regulating arrangements and connected to receive signals from and provide control signals to said distribution system temperature control arrangements, wherein said second plurality of said air distribution systems is greater than said first plurality of said air conditioning zones, and wherein said control signals to said distribution system temperature control arrangements are determined by said control unit based on said zone signals to achieve a selected altirable configuration of respective ones of said air distribution systems allocated to respective ones of said air conditioning zones.

2. The air conditioning system of claim 1, wherein said second plurality of air distribution systems (5 to 10) is an exact multiple of said first plurality of air conditioning zones (2 to 4).

3. The air conditioning system of claim 2, wherein said second plurality of air distribution systems is six air distribution systems and said first plurality of air conditioning zones is three air conditioning zones.

4. The air conditioning system of claim 1, wherein each of said zone temperature regulating arrangements comprises a respective zone temperature sensor (18 to 20) arranged in said passenger cabin to be located in a respective associated one of said air conditioning zones (2 to 4) for any of said configurations that may be selected.

5. The air conditioning system of claim 4, wherein each of said zone temperature regulating arrangements further comprises a respective zone temperature selector (45 to 47), wherein each of said zone temperature selectors and each of said zone temperature sensors is connected to said zone control unit (41) to provide output signals to said zone control unit (41) .

6. The air conditioning system of claim 1, wherein each of said distribution system temperature control arrangements comprises a respective mixing valve (29 to 34) arranged to controllably connect a respective one of said air distribution systems (5 to 10) to said air tap system responsively to said control signals from said zone control unit (41), and a respective delivered air temperature sensor (35 to 40) arranged in a respective one of said air distribution systems (5 to 10) and connected to provide delivered air temperature signals to said zone control unit (41).

7. The air conditioning system of claim 1, further comprising at least two hot air distributors (21, 22) that are each connected to said air tap system and to a subset of said second plurality of air distribution systems (5 to 10), wherein said subset comprises regularly alternating ones of said air distribution systems.

8. The air conditioning system of claim 1, wherein said zone control unit (41) comprises a separate zone circuit (42 to 44) connected to each of said zone temperature regulating arrangements, and a central processor (41A) connected to all of said zone circuits and connected to provide said control signals distribution system temperature control arrangements.

9. The air conditioning system of claim 8, wherein said zone control unit further comprises an interface (48) connected to said central processor (41A) to convey external input instructions corresponding to a selected one of said configurations.

10. The air conditioning system of claim 9, further comprising a keyboard (55) connected to said interface (48).

11. The air conditioning system of claim 9, further comprising a disc drive device (55) connected to said interface (48).

12. The air conditioning system of claim 1, further comprising a cabin configuration control unit (49) connected to said zone control unit (41).

13. The air conditioning system of claim 12, wherein said cabin configuration control unit (49) comprises a socket (51A) for receiving a plug-in hardware module.

14. The air conditioning system of claim 13, further comprising a plug-in hardware module (51) that comprises an electrically programmable semiconductor memory.

15. The air conditioning system of claim 14, wherein said semiconductor memory is preprogrammed and contains instructions corresponding to a selected one of said configurations.

16. The air conditioning system of claim 14, wherein said semiconductor memory is an EPROM.

17. The air conditioning system of claim 1, wherein said conditioned air provided by said air conditioning plant has a base temperature t, and wherein said distribution system temperature control arrangements mix a controlled amount of said heated air from said air tap system with said conditioned air in each of said air distribution systems (5 to 10) responsively to said control signals provided by said zone control unit (41), wherein the temperature of air delivered by each of said air distribution systems (5 to 10) has a respective mixed temperature $T_m=t+\Delta t$, and wherein said respective mixed temperature of each of said air distribution systems is controlled by a respective one of said distribution system temperature control arrangements in accordance with said selected configuration of said air distribution systems allocated to respective ones of said air conditioning zones.

\* \* \* \* \*